United States Patent
Boisson et al.

(10) Patent No.: US 11,525,366 B2
(45) Date of Patent: Dec. 13, 2022

(54) FLOW STRAIGHTENER UNIT COMPRISING A CENTERING AND ATTACHMENT PLATE

(71) Applicant: SAFRAN AIRCRAFT ENGINES, Paris (FR)

(72) Inventors: Alexandre Bernard Marie Boisson, Moissy-Cramayel (FR); Kaëlig Merwen Orieux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/292,122

(22) PCT Filed: Nov. 8, 2019

(86) PCT No.: PCT/FR2019/052666
§ 371 (c)(1),
(2) Date: May 7, 2021

(87) PCT Pub. No.: WO2020/095002
PCT Pub. Date: May 14, 2020

(65) Prior Publication Data
US 2021/0396143 A1    Dec. 23, 2021

(30) Foreign Application Priority Data
Nov. 9, 2018 (FR) ...................................... 1860376

(51) Int. Cl.
*F01D 9/04*    (2006.01)
*F01D 5/28*    (2006.01)

(52) U.S. Cl.
CPC ............. *F01D 9/042* (2013.01); *F01D 5/282* (2013.01); *F05D 2250/232* (2013.01); *F05D 2260/30* (2013.01); *F05D 2300/603* (2013.01)

(58) Field of Classification Search
CPC ... F01D 9/02; F01D 9/04; F01D 9/041; F01D 9/042; F01D 5/282; F01D 5/284;
(Continued)

(56) References Cited

U.S. PATENT DOCUMENTS

2012/0027604 A1* 2/2012 McDonald ............. F01D 9/042
416/219 R
2013/0287562 A1* 10/2013 Ishigure ................ F01D 25/246
415/208.1
(Continued)

FOREIGN PATENT DOCUMENTS

EP       2 412 931 A2    2/2012

OTHER PUBLICATIONS

French Search Report with Written Opinion dated Nov. 5, 2019 by the French Patent Office in French Application No. 1860376.
(Continued)

*Primary Examiner* — Eldon T Brockman
*Assistant Examiner* — Elton K Wong
(74) *Attorney, Agent, or Firm* — Sughrue Mion, PLLC (57) ABSTRACT

The invention concerns a flow straightener unit (1) for a fan module of a turbomachine, the straightener unit (1) comprising a plurality of blades (2) distributed about an axis of rotation, each blade (2) is made of a composite material and comprises an aerofoil (21) and a root (22) intended to be assembled on a hub (4) of the turbomachine. The unit (1) comprises a centring and attachment plate (3) of the blade (2) on the turbomachine intended to be attached to the hub (4) at a determined azimuthal position and to the root (22) of the blade (2), the plate (3) is designed to be screwed to the hub (4) by screws (51a) that are longitudinal with respect to the axis of rotation of the unit (1) and screwed to the root (22) of the blade (2) by screws (52) that are radial with respect to the axis of rotation of the unit (1).

10 Claims, 10 Drawing Sheets

(58) Field of Classification Search
CPC ...... F01D 25/24; F01D 25/243; F01D 25/246; F05D 2250/232; F05D 2260/30; F05D 2300/603; F05D 2300/6033
See application file for complete search history.

(56) References Cited

U.S. PATENT DOCUMENTS

| | | |
|---|---|---|
| 2014/0056702 A1* | 2/2014 | Simonds ............... F01D 25/243 415/209.2 |
| 2015/0064000 A1 | 3/2015 | Yagi et al. |
| 2018/0156237 A1 | 6/2018 | Papin et al. |

OTHER PUBLICATIONS

International Search Report dated Feb. 19, 2020 in International Application No. PCT/FR2019/052666.
Written Opinion of the International Searching Authority dated Feb. 19, 2020 in International Application No. PCT/FR2019/052666.

* cited by examiner

FLOW STRAIGHTENER UNIT COMPRISING A CENTERING AND ATTACHMENT PLATE

CROSS-REFERENCE TO RELATED APPLICATIONS

This application is a National Stage of International Application No. PCT FR2019/052666 filed on Nov. 8, 2019, claiming priority based on French Patent Application No. 1860376 filed on Nov. 9, 2018, the entire contents of each of which being herein incorporated by reference

FIELD OF THE INVENTION AND STATE OF THE ART

The invention relates to the field of turbomachine blades.

A turbomachine conventionally comprises a compressor, a combustion chamber and a turbine. The role of the compressor is to increase the air pressure supplied to the combustion chamber. The role of the turbine is to rotatably drive the compressor by taking part of the pressure energy of the hot gases leaving the combustion chamber and transforming it into mechanical energy.

A turbomachine can be of the "double-flow" type, that is to say it is crossed by two air flows: a primary flow and a secondary flow. The primary flow is produced by elements constituting a single-flow turbomachine, to which one or several additional turbines is/are added in order to drive a compression stage, the fan module. This fan module comprises a fan, which is equipped with large-dimensioned blades, the fan blades producing the secondary flow. The fan slightly increases the pressure of the gases passing therethrough, but since its diameter is large, the energy produced for the thrust is high. The fan module also comprises a flow straightening grid positioned behind the fan to straighten the air flow coming from the fan.

The current trend in civil aircraft engines is aimed at reducing the specific consumption, the noise pollution and the nitrogen oxide (Nox) emissions. One of the technical solutions adopted by engine manufacturers consists in increasing the bypass ratio between the primary flow and the secondary flow. As such, architecture such as UHBR (Ultra High Bypass Ratio) engines is envisaged as a potential replacement for the current turbomachines for medium-haul flights.

The diameters of the fan and of the flow straightening grid (called OGV) are then greatly increased, and the constraints in particular related to the transport of the parts require a modular mounting of the fan module on the hub. In other words, the dimensions of the parts impose a modular mounting of the secondary on the primary.

However, during a modular mounting, the positioning of the fan module is achieved by the straightener. Under these conditions, the straightener must be correctly centered on the hub.

Nevertheless, straighteners made of composite materials are used today, because these materials have excellent mechanical performances for a mass which is significantly lower than the metal.

However, the use of a straightener made of composite material involves its radial fastening on the hub and an intermediate casing shroud, to guarantee its mechanical strength. To achieve the positioning of the fan module within the framework of the modular mounting, the straightener then needs a centering device (conical bearing seat, axial abutment, etc.).

For example, a known solution from document EP 2 412 931 consists in ensuring the positioning of the straightener by using a dovetail-type connection. Thus, a blade root is screwed to the hub, and the vane is linked to the blade root by a dovetail-type connection. This connection allows ensuring the accurate positioning of the vane.

This disposition remains complex because on the one hand the dovetail is expensive and complicated to manufacture with a composite straightener and on the other hand the assembly is complex to implement. In general, the use of a centering device is not desirable in the case of a straightener made of composite material, because it proves to be expensive to implement and mechanically unsustainable.

GENERAL PRESENTATION OF THE INVENTION

In this context, the objective of the present invention is to provide a straightener assembly in which the fastening and the positioning of the straightener are ensured in a simple and robust manner.

According to a first aspect, the invention relates to a flow straightener assembly for a fan module of a turbomachine. The straightener assembly comprises a plurality of blades distributed about an axis of revolution of the straightener assembly. Each blade is made of composite material and has a vane and a root intended to be assembled to a hub of the turbomachine. The assembly comprises a centering and fastening plate on the turbomachine, intended to be fastened on the one hand to the hub at a determined azimuthal position and on the other hand to the root of one of the blades. The plate is adapted to be screwed to the hub by screws extending longitudinally relative to the axis of revolution of the assembly and screwed to the root by screws extending radially relative to the axis of revolution of the assembly.

In a particularly advantageous manner, the use of a plate as a centering and fastening member, separate from the blade and from the hub, allows simplifying the mounting of the flow straightener assembly. The double function of the plate allows dispensing with complex solutions such as the dovetails. Indeed, the plate is fastened to the blade and then positioned accurately on the hub. The position of the plate as well as its geometry being known and accurate, as a result the fastening of the blade on the plate guarantees accurate positioning of the blade. Thus, the blade can be positioned accurately on the plate and can be simply fastened thereto. In addition, the fastening of the plate on the hub with longitudinal screws and the fastening of the plate to the blade root with radial screws allows the good transmission of the mechanical forces from the hub towards the blade. Thus, the mechanical forces can circulate in the plate, without accumulating therein. In other words, this fastening allows preventing some stress concentrations in the plate and therefore allows increasing its service life.

The invention therefore proposes a straightener assembly in which the fastening and the positioning of the straightener are ensured in a simple and robust manner.

The plate may have a radial section chosen among a substantially L or S or triangular shape.

The root can be fastened to the hub only via the plate.

The blade may have a leading portion and a trailing portion, the leading portion of the root being fastened directly to the hub and the trailing portion of the root being fastened to the hub via the plate.

The plate can be made of metal.

A platform can be positioned between the root and the vane, the platform having a conical radial section having a deflector function for an air flow.

The platform can be integral with the vane.

The platform can be a separate element from the vane, fastened to the vane.

According to a second aspect, the invention relates to a turbomachine comprising a flow straightener assembly for a fan module comprising at least one blade having a vane and a root fastened to a hub of the turbomachine, and a member for centering and fastening the blade on the turbomachine fastened on the one hand to the hub at a determined azimuthal position and on the other hand to the blade root.

According to a third aspect, the invention relates to a method for assembling a flow straightener assembly for a fan module to a hub of a turbomachine comprising the following steps:

fastening a plate to a flow straightener blade, fastening, on the hub, the plate fastened to a blade, at a determined azimuthal position.

DESCRIPTION OF THE FIGURES

Other characteristics and advantages of the invention will emerge from the following description, which is purely illustrative and not limiting, and should be read in relation to the appended figures in which.

DETAILED DESCRIPTION OF THE INVENTION

General Architecture

The invention relates to a flow straightener assembly 1 for a fan module of a turbomachine comprising a plurality of blades 2 distributed about an axis of revolution. Each blade 2 is made of a composite material and has a vane 21 and a root 22 intended to be assembled to a hub 4 of the turbomachine. In addition, the assembly 1 comprises a plate 3 fastened on the one hand to the hub 4 at a determined azimuthal position and on the other hand to the blade 2. It is specified that by "determined azimuthal position" it is meant an accurate and chosen position on the hub 4. The hub can be modeled in a cylindrical reference frame, the azimuthal position is defined by an angular sector (i.e. position) and a position relative to the longitudinal axis of the hub 4.

Thus, as will be described below, within the framework of a modular assembly, the plates 3 are previously fastened to the blades 2 then to the hub 4, the right position of the blades 2 being guaranteed by the right positioning of each plate 3.

It is recalled that, in the present document, by "fastened" it is meant that the parts are secured to each other, in a standardized mechanical connection of the embedding type.

In addition, it is specified that in the present document, by "longitudinal axis" it is meant an axis parallel to the axis of revolution of the straightener assembly and therefore an axis of rotation of the blade 2. Likewise, by "radial axis" it is meant an axis perpendicular to the axis of revolution of the straightener assembly and therefore an axis of rotation of the blade 2.

Straightener Blade

The straightener blade 2 mainly comprises a vane 21 and at least one root 22. The vane 21 has a leading edge and a trailing edge. In a conventional manner, "leading portion" 22a denotes a portion of the root 22 in line with the leading edge of the vane 21 and "trailing portion" 22b denotes a portion of the root 22 in line with the trailing edge of the vane 21.

In a known manner, the vane 21 has a geometry adapted to straighten an air flow derived from a fan positioned upstream.

The root 22 can conform to the known geometries (i.e. conventional blades 2 can be used). Thus, the root 22 may be continuous from the leading edge portion 22a to the trailing edge portion 22b, or may be perforated between the leading edge portion 22a and the trailing edge portion 22b. Likewise, in a traditional manner, the root 22 can be adapted to be fastened by fastening means only along a radial axis.

Figure 1:
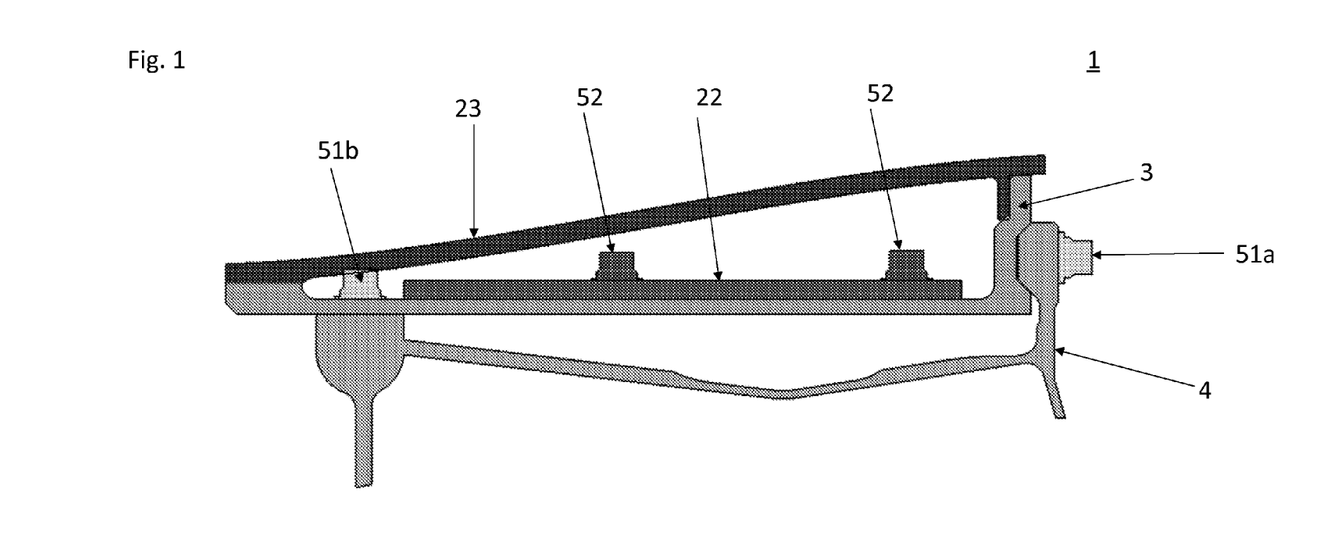
FIG. 1 is a schematic sectional representation of a straightener assembly according to a first embodiment of the invention.

According to a first embodiment presented in FIG. 1, the root 22 has a substantially planar radial section.

According to the embodiments presented in FIGS. 2, 6, 7 and 10, the root 22 has a substantially S-shaped radial section. It should be noted that the curvature of the S-shaped section varies depending on the embodiments. This geometry advantageously allows the root 22 to adapt accurately to the geometry of the hub 4.

Figure 5:
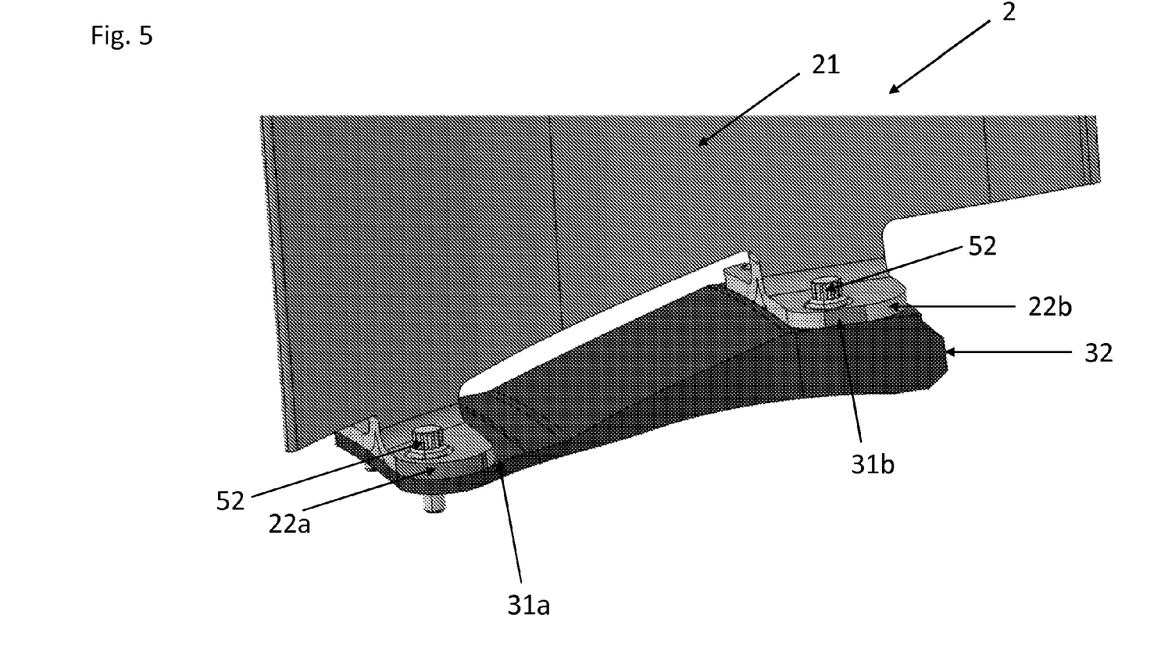
FIG. 5 is a partial perspective view of a straightener assembly according to the second embodiment.

According to the embodiment presented in FIG. 5, the blade 2 may have a root 22 in two separate parts, a first part corresponding to the leading portion 22a and a second part corresponding to the trailing portion 22b, and particularly a root 22 reduced to two fastening areas.

As will be detailed below, the root 22 is adapted to be screwed to a plate 3 and/or to the hub 4. As will be detailed below, the entire root 22 or only a portion of it can be fastened to the plate 3.

According to the embodiments presented in FIGS. 1, 2, 6 and 7, the blade 2 has a platform 23 positioned between the root 22 and the vane 21. The platform 23 has a conical radial section having a deflector function (i.e. guide) for the air flow. Alternatively, the platform 23 can be added onto an existing vane 21.

Preferably, the blade 2 is made of composite material. It is specified that by "composite material" it is meant a material comprising a resin in which fibers are embedded. The resin can for example be a polymer and the fibers can for example be carbon fibers, glass fibers.

Platinum

Advantageously, the plate 3 is a centering and fastening member adapted to be interposed between the hub 4 and the root 22. The plate 3 can be made of metal and shaped by forging. According to the embodiments, inner ribs can optionally enhance the mechanical structure of the plate.

In general, whatever the embodiment, the plate 3 has at least one longitudinal surface 31 adapted to be fastened on the underside of a root 22 and a radial surface 32 adapted to be fastened to the hub 4, for example by a conical bearing seat. In general, common to all the embodiments presented below, the fastening of the longitudinal surface 31 on the underside of the root 22 is achieved by radial screws 52. In addition, the fastening of the radial surface 32 to the hub 4 is achieved by longitudinal screws 51a. In other words, the plate 3 combines two distinct functions distributed over two separate surfaces of the plate. On the one hand, the longitudinal fastening to the hub 4 via the longitudinal surface 31, and on the other hand the radial fastening to the root 22 via the radial surface 32.

According to a first embodiment presented in FIG. 1, the plate 3 has a substantially L-shaped radial section. According to this embodiment, the plate 3 is adapted to fully receive the root 22.

According to the embodiments presented in FIGS. 2 to 5, the plate 3 has a substantially S-shaped radial section. According to these embodiments, the plate 3 is adapted to fully receive the root 22, whether in one or in two parts.

According to these embodiments, the plate 3 has a first longitudinal surface 31a adapted to be fastened on the underside of a leading portion of a root 22, and a second longitudinal surface 31b adapted to be positioned on the underside of a trailing portion of a root 22. The substantially S-shaped radial section is such that the first longitudinal surface 31a and the second longitudinal surface 31b are in separate parallel planes.

Figure 6:
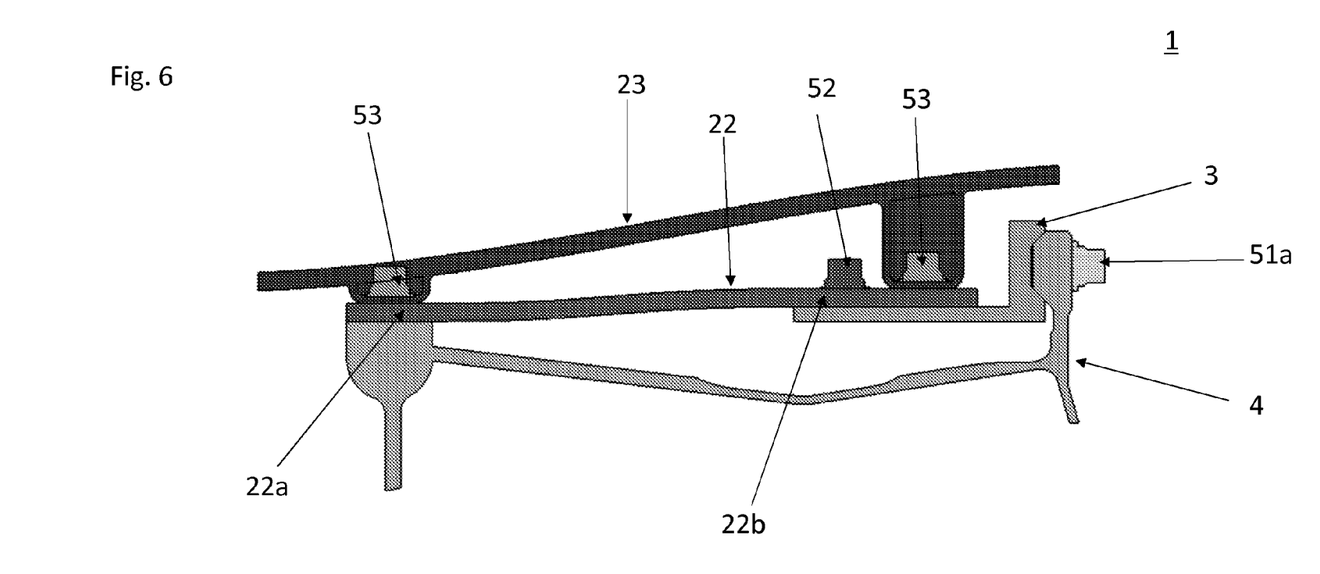
FIG. 6 is a schematic sectional representation of a straightener assembly according to a third embodiment of the invention.
Figure 7:
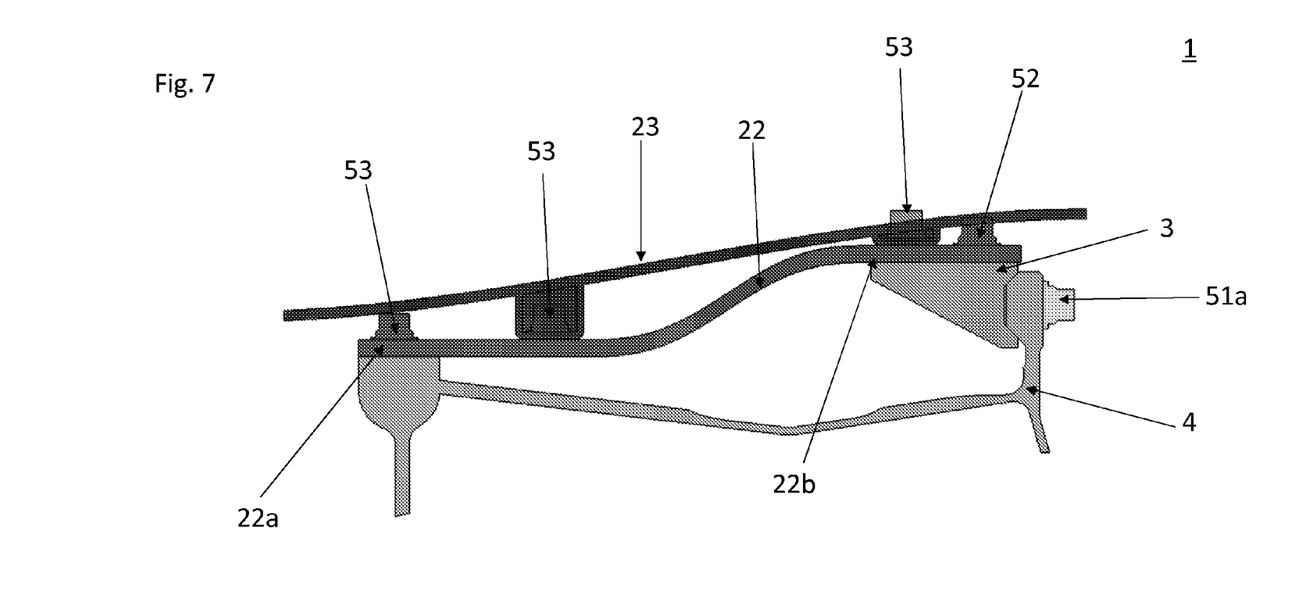
FIG. 7 is a schematic sectional representation of a straightener assembly according to a fourth embodiment of the invention.
Figure 8:
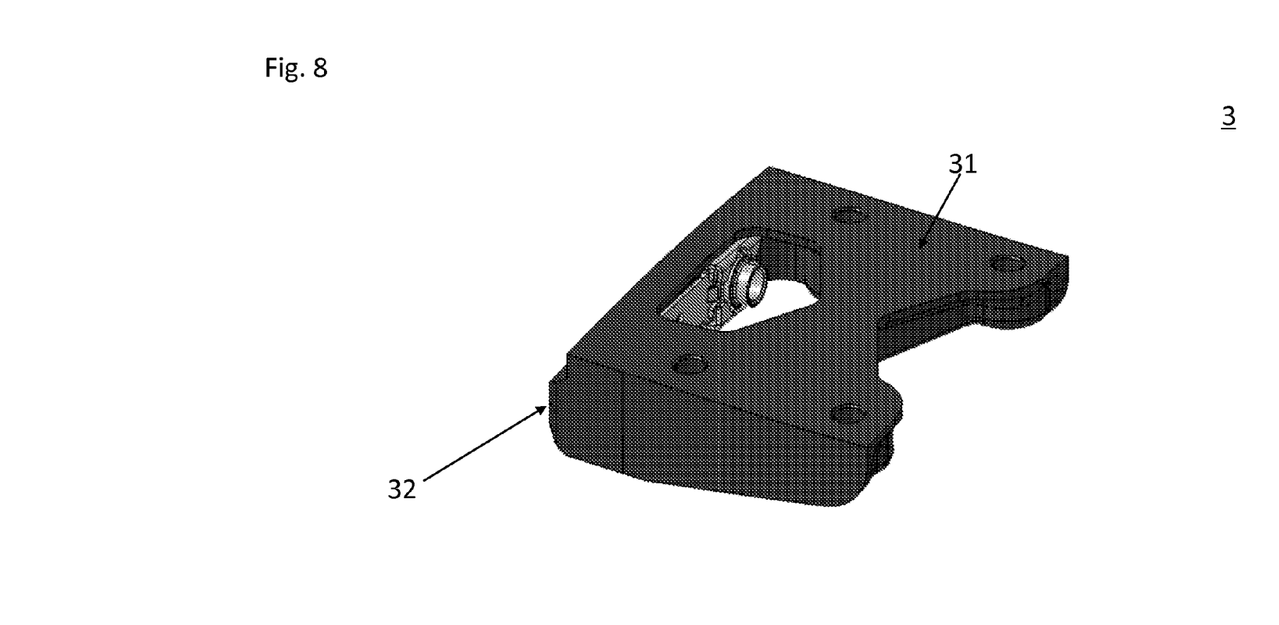
FIG. 8 is a perspective top view of a centering and fastening member according to the fourth embodiment.
Figure 9:
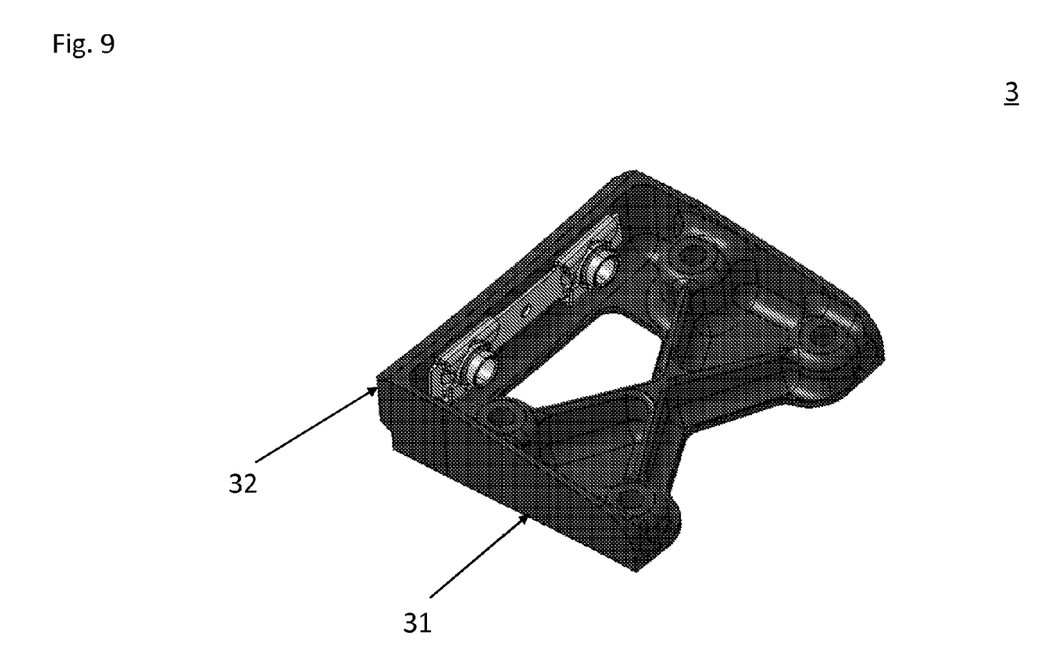
FIG. 9 is a perspective bottom view of a centering and fastening member according to the fourth embodiment.
Figure 10:
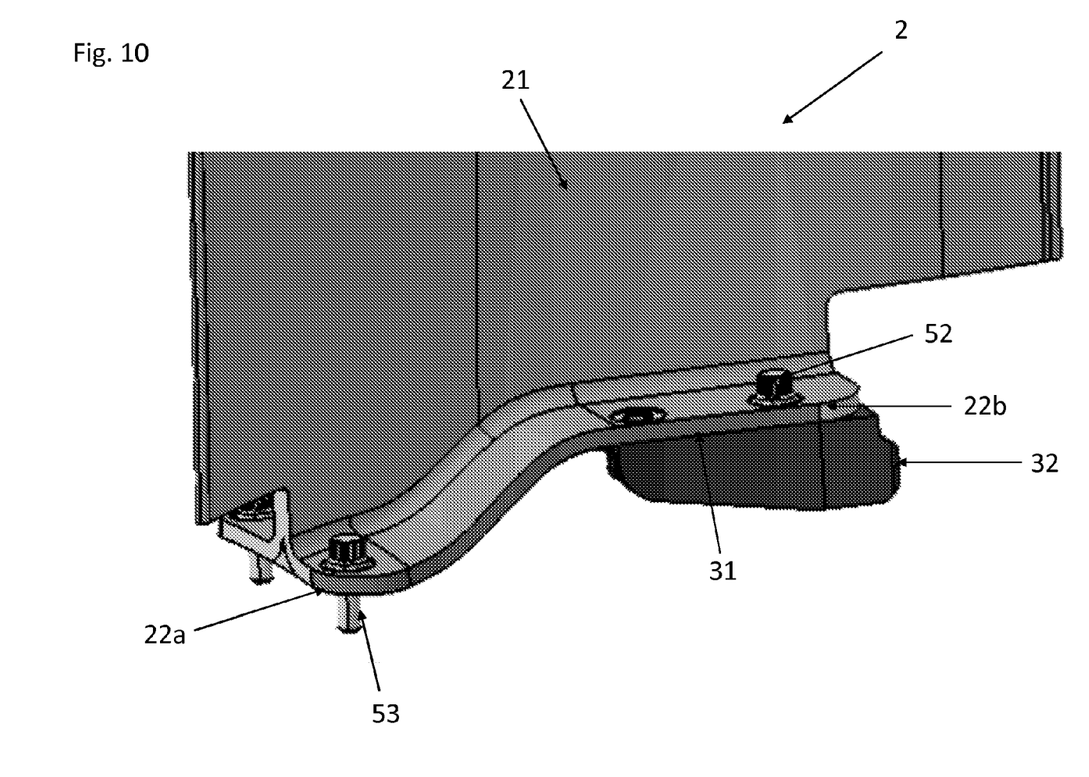
FIG. 10 is a partial perspective view of a straightener assembly according to the fourth embodiment.

According to one embodiment presented in FIG. 6, the plate 3 has a substantially L-shaped radial section. According to this embodiment, the plate 3 is adapted to be positioned only on the underside of a trailing portion 22b of the root 22.

According to one embodiment presented in FIGS. 7 to 10, the plate 3 has a substantially triangular shaped radial section. According to this embodiment, the plate 3 is adapted to be positioned only on the underside of a trailing portion 22b of the root 22.

Assembly According to the First Embodiment

According to the first embodiment, as explained above, the root 22 is entirely fastened to the plate 3. In other words, according to this embodiment, the root 22 is fastened to the hub 4 only via the plate 3.

In a particularly advantageous manner, the root 22 is fastened by radial screws 52 passing through the longitudinal surface 31. This particularly advantageous disposition is common to all the embodiments, and allows simple fastening of the root 22 to the plate 3, while at the same time guaranteeing the right positioning of the root 22. In addition, this disposition advantageously allows the transmission of the mechanical forces from the hub 4 towards the vane 21, so that the forces are not concentrated in the plate 3.

According to the first embodiment, it is remarkable that a leading portion of the platform 23 can be fastened with the plate 3. Likewise, a trailing portion of the platform 23 can be fastened with the plate 3. This disposition allows creating an air flow tight area between the platform 23 and the plate 3, so as not to create disturbances in the air flow.

Then, the plate 3 is fastened to the hub 4 by longitudinal screws 51a positioned in the radial surface 32, as well as by radial screws 51b.

Assembly According to the Second Embodiment

Figure 2:
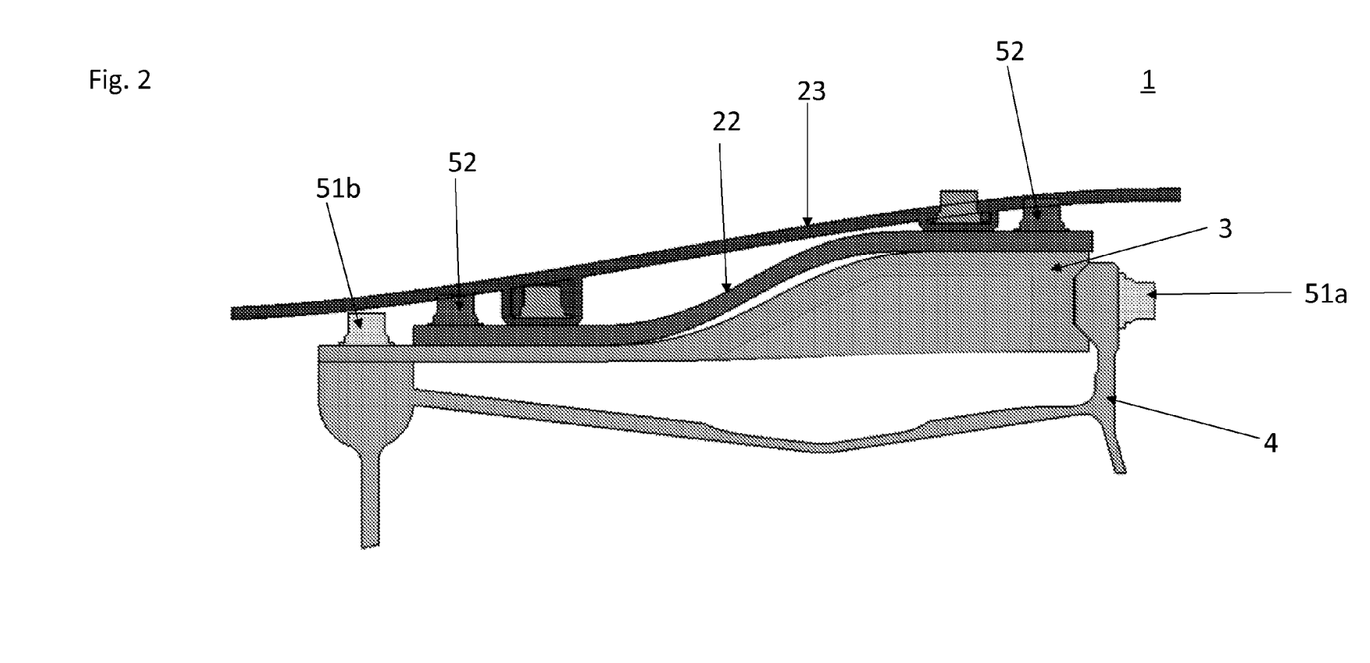
FIG. 2 is a schematic sectional representation of a straightener assembly according to a second embodiment of the invention.
Figure 3:
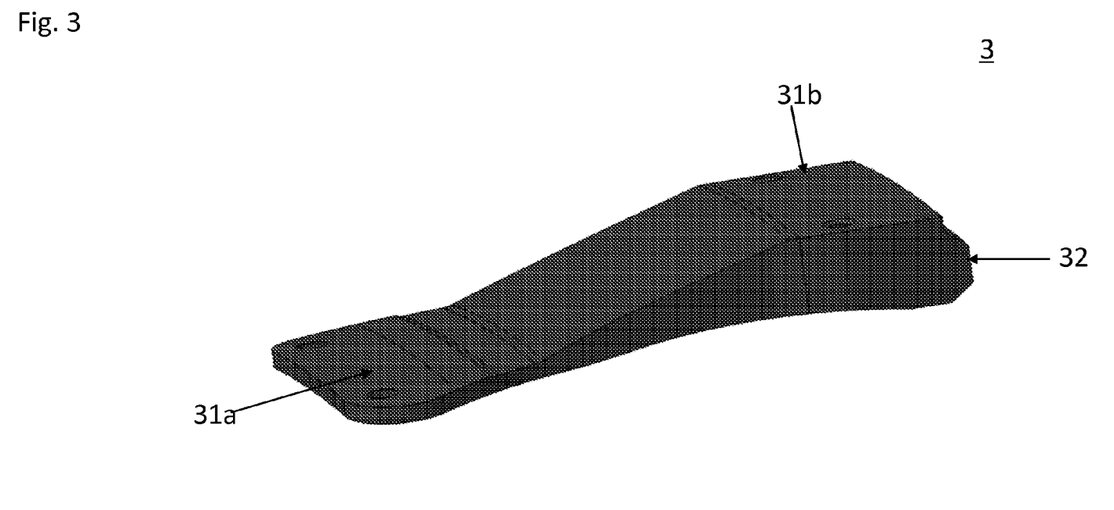
FIG. 3 is a perspective top view of a centering and fastening member according to the second embodiment.
Figure 4:
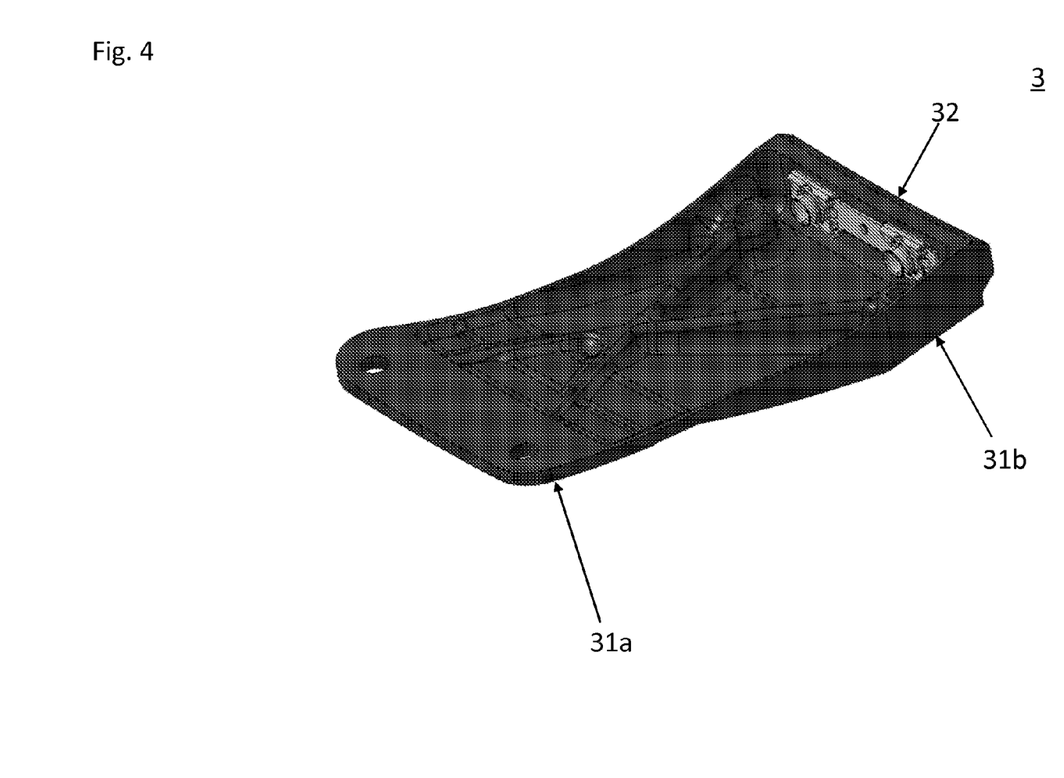
FIG. 4 is a perspective bottom view of a centering and fastening member according to the second embodiment.

The assembly according to the second embodiment is identical to the assembly presented for the first embodiment, notwithstanding the differences in geometries of the radial sections of the root 22 and of the plate 3. As can be seen in FIG. 2, this embodiment is adapted for the fastening of a blade 2 whose root 22 has an S-shaped radial section.

Nevertheless, it is remarkable that according to the second embodiment, the platform 23 is fastened to the root 22 (and not to the plate 3).

According to one variant, presented in FIG. 5, the root 22 can be split into two parts. This disposition allows having a root 22 whose geometry is simplified as much as possible and whose mass is reduced as much as possible. Thus, this disposition advantageously allows simplifying the method for manufacturing the root and therefore reducing its manufacturing costs. In addition, the mass reduction very advantageously allows reducing the energy consumption of the turbomachine.

These two parts are both fastened to the plate 3.

Assembly According to the Third and Fourth Embodiments

According to these embodiments, represented in FIGS. 6 to 10, the plate 3 is fastened only to a trailing portion 22b of the root 22 and the leading portion 22a of the root 22 is fastened directly to the hub 4 by radial screws 53.

According to these embodiments, the platform 23 is screwed to the root 22. According to a particular disposition represented in FIG. 6, the same screw 53 can connect the platform 23, the leading portion 22a of the root 22 and the hub 4.

In a particularly advantageous manner, whatever the embodiment, the entire fastening can be achieved by screws. In other words, the assembly 1 according to the invention does not comprise complex mechanical connections such as dovetails.

It is remarkable that according to these embodiments, the plate 3 is of small dimensions sufficient to ensure the right positioning of the blade 2. In other words, according to these embodiments, the fastening of the leading portion 22a of the root 22 serves only as a fastener and has no positioning function. It should be noted that the small dimensions of the plate 3 allow a reduction of the mass and a simplification of the manufacture. As for the root 22 presented in FIG. 5, the mass reduction allows reducing the energy consumption of the turbomachine. It could also be possible to envisage combining the root of FIG. 5 with the plate 3 of FIGS. 7 to 10.

Turbomachine

According to another aspect, the invention relates to a turbomachine comprising a flow straightener assembly 1 for a fan module comprising at least one blade 2 having a vane 21 and a root intended to be fastened to a hub 4 of the turbomachine, and a plate 3 of the blade 2 on the turbomachine fastened on the one hand to the hub 4 at a determined azimuthal position and on the other hand to the root 22 of the blade 2.

Assembly Method

According to a third aspect, the invention relates to a method for assembling a flow straightener assembly 1 for a fan module to a hub 4 of a turbomachine comprising the following steps:

fastening at least one a plate 3 to a flow straightener blade 2, fastening, on the hub 4, the plate 3 fastened to the blade 2, at a determined azimuthal position.

This assembly method is particularly advantageous insofar as the plate 3 previously fastened to the blade 2 allows guaranteeing the right positioning of the blade 2 on the hub 4. Thus, it is possible to dispense with complex and unsustainable mechanical connections.

The invention claimed is:

1. A flow straightener assembly for a fan module of a turbomachine, the flow straightener assembly comprising:
   a plurality of blades distributed about an axis of revolution of the flow straightener assembly, each blade of the plurality is made of a composite material, each blade having a vane and a root configured to be assembled to a hub of a turbomachine; and
   a centering and fastening plate configured to be fastened to the hub at a determined azimuthal position and to the root of one blade of the plurality of blades, the centering and fastening plate configured to be fastened to the hub by screws extending longitudinally relative to the axis of revolution of the flow straightener assembly and attached to the root by screws extending radially relative to the axis of revolution of the assembly.

2. The flow straightener assembly of claim 1, wherein the plate has a radial section having a L or S or triangular shape.

3. The flow straightener assembly of claim 1, wherein the root is fastened to the hub only via the plate.

4. The flow straightener assembly of claim 1, wherein the root has a leading portion and a trailing portion, the leading portion of the root being fastened directly to the hub and the trailing portion of the root being fastened to the hub via the plate.

5. The flow straightener assembly of claim 1, wherein the plate is made of metal.

6. The flow straightener assembly of claim 1, wherein a platform is positioned between the root and the vane, the platform having a conical radial section configured to having a deflector function for an air flow.

7. The flow straightener assembly of claim 6, wherein the platform is integral with the vane.

8. The flow straightener assembly of claim 6, wherein the platform is an element separable from the vane, and is fastened to the vane.

9. A turbomachine comprising:
   a fan module;
   a hub on which the fan module is mounted; and
   a flow straightener assembly comprising:
   a plurality of blades distributed about an axis of revolution of the flow straightener assembly, each blade having a vane and a root fastened to the hub of the turbomachine, and
   a respective centering and fastening plate fastened to the hub at a determined azimuthal position and to the root of each respective blade of the plurality of blades, the centering and fastening plate fastened to the hub by screws extending longitudinally relative to the axis of revolution of the flow straightener assembly and attached to the root by screws extending radially relative to the axis of revolution of the assembly.

10. A method for assembling a flow straightener assembly in a turbomachine, the method comprising:
   fastening a centering and fastening plate to a blade of a flow straightener assembly, the blade being made of a composite material, the blade having a vane and a root, the centering and fastening plate fastened to the root of the blade by screws extending radially relative to an axis of revolution of the flow straightener assembly; and
   fastening the centering and fastening plate to a hub of a turbomachine at a determined azimuthal position, the centering and fastening plate fastened to the hub by screws extending longitudinally relative to the axis of revolution of the flow straightener assembly.

* * * * *